J. G. B. Gill.
Cotton Planter.
Nº 94,301.    Patented Aug. 31, 1869.
Fig. 1.
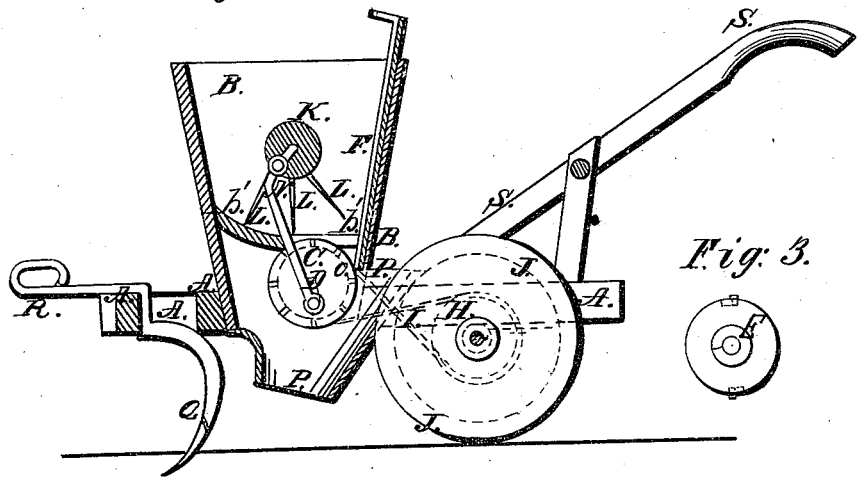
Fig. 3.
Fig. 2.
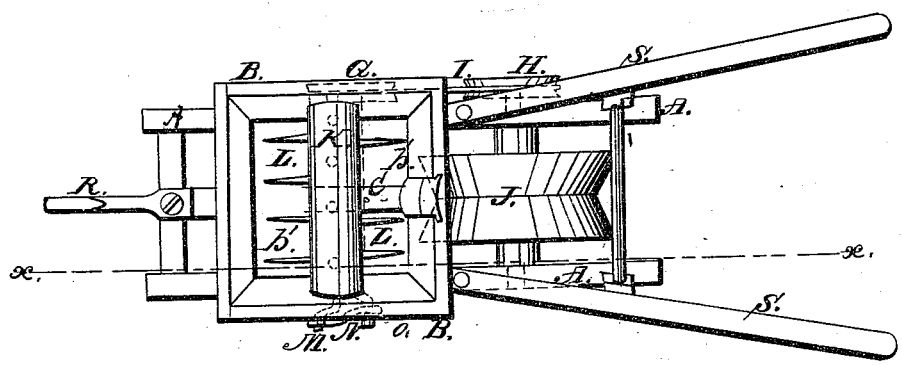
Witnesses.
Hinchman
Jno. H. Brooks
Inventor
J. G. B. Gill.
per [signature]
attys.

United States Patent Office.

JOHN G. B. GILL, OF CHESNUT GROVE, SOUTH CAROLINA.

Letters Patent No. 94,301, dated August 31, 1869.

IMPROVEMENT IN COTTON-SEED AND CORN-PLANTER.

The Schedule referred to in these Letters Patent and making part of the same.

*To all whom it may concern:*

Be it known that I, JOHN G. B. GILL, of Chesnut Grove, in the district of Chester, and State of South Carolina, have invented a new and improved Cotton-Seed and Corn-Planter; and I do hereby declare that the following is a full, clear, and exact description thereof, which will enable others skilled in the art to make and use the same, reference being had to the accompanying drawings, forming part of this specification, in which—

Figure 1 is a detail sectional view of my improved machine, taken through the line x x of fig. 2.

Figure 2 is a top view of the same.

Figure 3 is a detail side view of one of the distributing-wheels.

Similar letters of reference indicate corresponding parts.

My invention has for its object to furnish a simple and convenient machine, which shall be so constructed and arranged that it may be readily adjusted for planting corn or cotton-seed, or for distributing fertilizers, as may be desired; and It consists in the construction and combination of the various parts of the machine, as hereinafter more fully described.

A is the frame of the machine, to the middle part of which is attached the hopper B, in which the seed or fertilizer is put.

b' is the bottom of the hopper, in the rear middle part of which is formed a slot, to receive the upper part of the distributing or planting-wheel C.

The wheel C is detachably attached to the shaft D, which works in bearings, attached to the frame A in such a position that the upper side of the wheel C may enter the slot in the hopper-bottom b', to receive the seed and convey it to the conductor-spout, by which it is conducted to the ground.

When the machine is used for planting cotton-seed, the face of the wheel C is grooved, as shown in figs. 1 and 2, and in the groove thus formed are secured spikes, which take hold of the cotton-seed and draw it out.

For planting corn, the wheel E is used, having square recesses formed in its face at suitable distances apart, which receive the seed and convey it to the conductor-spout.

The amount of seed carried out by the wheel is regulated by the slide F, placed in a groove in the rear side of the hopper D, and the lower end of which passes down, so as to close, more or less, the opening in the rear part of the hopper, through which the dropping-wheel conveys the seed to the conductor-spout.

To one end of the shaft D is attached a pulley, G, around which, and around the pulley H, attached to the end of the journal of the covering roller, passes a band, I.

J is the covering-roller, which also serves as the drive-wheel, and the journals of which revolve in bearings attached to the rear part of the frame A.

The face of the wheel or roller J is deeply grooved, as shown in figs. 1 and 2, so as to press the sides of the furrow down upon the seed to cover it, leaving the covering-dirt in the form of a ridge.

K is the stirrer-shaft, the journals of which work in bearings in the sides of the hopper B, and to the under side of which are attached three rows of long spikes L, which, as the shaft K rocks, keep the seed directly above the discharge-opening, agitated to facilitate its escape from the hopper.

To the projecting end of one of the journals of the stirrer-shaft K, is attached, or upon it is formed a crank, M, to the crank-pin of which is pivoted the upper end of the pitman N, the lower end of which is pivoted to the crank-pin of the crank O, formed upon or attached to the end of the shaft D.

The cranks M and O, should be made of unequal length, so that the stirrer-shaft K may be rocked by the revolution of the shaft D.

P is the conductor-spout, which is attached to the lower end of the hopper B in such a position as to receive the seed from the wheel C or E, and conduct it to the furrow, and the rear part of which is so formed that the operator can see the seed as it passes from said wheel to said spout.

Q is the plow that opens the furrow, to receive the seed, and the upper end of the standard of which is securely attached to the forward part of the frame A.

R is the draught-hook, which may be formed upon the upper end of the plow-standard Q, or attached to the forward part of the frame A, as may be desired or convenient.

S are the handles, by means of which the machine is guided, and which are attached to the rear part of the frame A, as shown in figs. 1 and 2.

Having thus described my invention,

I claim as new, and desire to secure by Letters Patent—

The combination of the planting or drill-wheel, provided with grooves and iron spikes upon its periphery, with the slide, to regulate the supply of seed, as and for the purpose specified.

JOHN G. B. GILL.

Witnesses:
JAMES W. KEE,
B. M GRIFFIN.